Oct. 28, 1958    E. WILDHABER ET AL    2,857,819
METHOD AND MEANS FOR PRODUCING TAPERED GEARS
Filed Jan. 23, 1952    6 Sheets-Sheet 1

INVENTORS
ERNEST WILDHABER
CHARLES B. KING
BY
Richard W. Treverton
ATTORNEY

INVENTORS
ERNEST WILDHABER
CHARLES B. KING
BY
*Richard W. Treverton*
ATTORNEY

Oct. 28, 1958   E. WILDHABER ET AL   2,857,819
METHOD AND MEANS FOR PRODUCING TAPERED GEARS
Filed Jan. 23, 1952   6 Sheets-Sheet 4
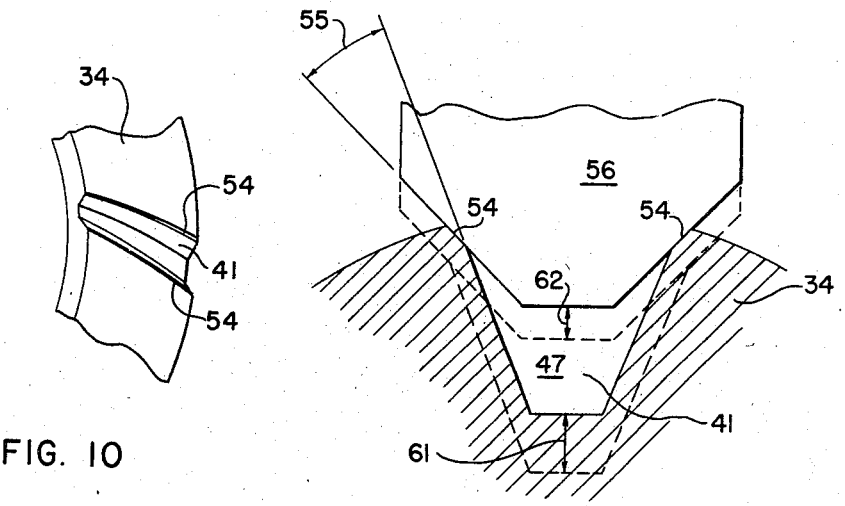
FIG. 10
FIG. 11
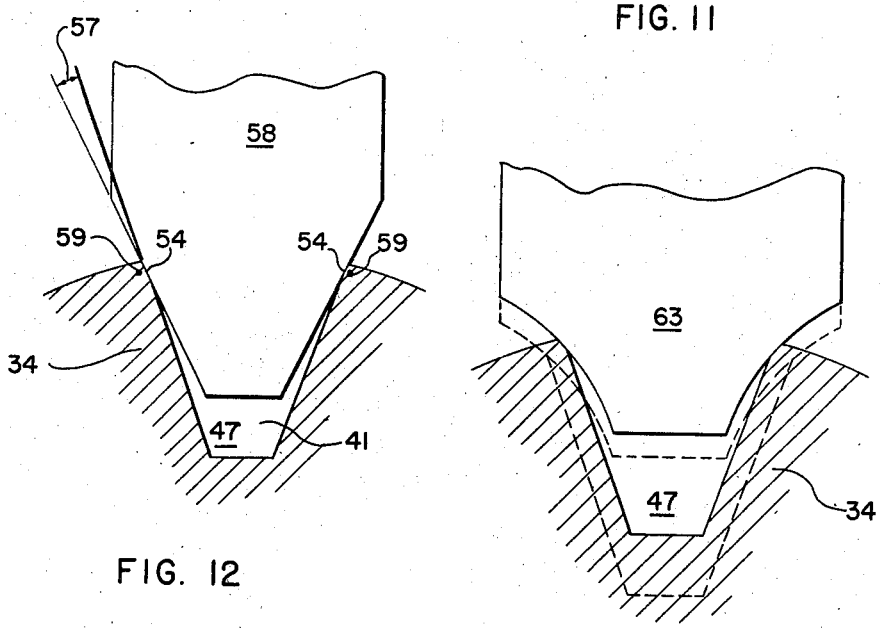
FIG. 12
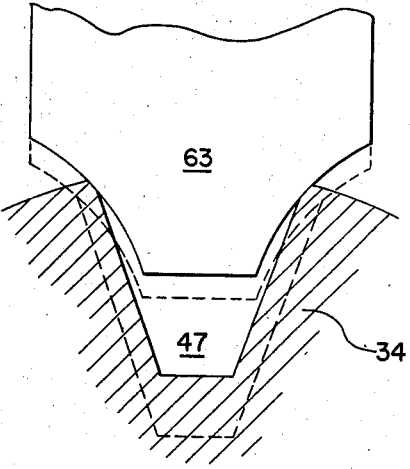
FIG. 13
INVENTORS
ERNEST WILDHABER
CHARLES B. KING
BY
*Richard W. Treverton*
ATTORNEY Oct. 28, 1958    E. WILDHABER ET AL    2,857,819
METHOD AND MEANS FOR PRODUCING TAPERED GEARS
Filed Jan. 23, 1952    6 Sheets-Sheet 5

INVENTORS
ERNEST WILDHABER
CHARLES B. KING
BY
Richard W. Treverton
ATTORNEY

United States Patent Office 2,857,819
Patented Oct. 28, 1958

2,857,819

METHOD AND MEANS FOR PRODUCING TAPERED GEARS

Ernest Wildhaber and Charles B. King, Brighton, N. Y., assignors to The Gleason Works, Rochester, N. Y., a corporation of New York Application January 23, 1952, Serial No. 267,824

32 Claims. (Cl. 90—5)

The present invention relates to an improved method and means for cutting tapered gears.

In conventional production with straight sided face mill cutters of this general kind of gear, and of the generated pinion to mate with it, the gear cutter is set to cut along the root plane of the gear, and the pinion cutter to cut to the root plane of the pinion. As a result, the pressure angles of the gear and pinion teeth do not match from end to end of the teeth, producing an objectionable bias tooth bearing, unless some remedial procedure is followed. Various procedures for this purpose have been devised heretofore, the one most commonly used being the cutting of the pinion to a different cone apex position on each side of the pinion teeth, and different from that on which it runs with its mate gear. This method is disclosed in Patent No. 1,685,442 of the present coinventor E. Wildhaber and A. H. Candee. In cutting pinions to mate with non-generated gears it has the limitation that for pairs of low tooth number ratio, the tilt of the cutter relative to the axis of the generating motion becomes very large when cutting one side of the pinion teeth and exceeds the range of tilt adjustment provided on conventional pinion generating machines. Another limitation in producing non-generated gears for pairs of low tooth number ratio is the change in pressure angle from end to end of the teeth. This change becomes progressively greater as the root cone angle of the gear is made smaller and as the curvature of the root cone accordingly becomes greater.

One object of the present invention is to provide an improved form of tooth which does not require any bias correction and which has less variation in pressure angle from end to end of the tooth.

Another object of the present invention is to enable generation of the pinions, especially for lower ratio gear pairs, without increasing the required cutter tilt beyond that which is required to cut to the root plane when the pinion is mounted to the cone apex position on which it will run with its mate gear. According to the invention, the blades of the gear cutter are arranged along a helix, and as the cutter rotates about the axis of the helix it is also moved along that axis, relative to the work, so that the cutting edges of the blades follow a helical path. The side faces of the gear teeth thus become helicoidal surfaces, which closely approximate the conical surfaces defined by the active profiles of the rotary cutters employed in generating the pinion teeth. Accordingly the gear and pinion teeth match closely in pressure angle throughout their length, thus obviating bias tooth bearing without resort to any of the special procedures heretofore employed for this purpose in the cutting of the pinion.

In the prior art the axis of rotation of the gear cutter is disposed in a plane which is so positioned as to contain a line which passes through a selected mean point of the tapered tooth space being cut and is normal either to the root cone or to the pitch cone of the gear. In other words the plane containing the cutter axis is so positioned that it intersects a plane containing the gear axis in a line that passes through the mean point and is inclined to the plane of rotation of the gear by an angle substantially equal to or less than the pitch angle of the gear. According to the present invention the corresponding plane containing the cutter axis is positioned differently. It is positioned so as to intersect a plane containing the gear axis in a line that, while also passing through the mean point of the tooth space, is inclined to the plane of rotation of the gear by an angle substantially equal to or greater than the face angle of the gear. Because of this the path of the cutter blades more closely follows the curvature of the face of the gear, with the result that there is substantially less change in pressure angle from end to end of the gear teeth.

Another object of the invention is to relieve the tips of the gear teeth in the same operation with cutting of the working tooth faces, and with the same cutter. The relief so provided may be either in the form of a chamfer, to eliminate sharp edges along the tops of the teeth, or a relief formed at only a small angle from the working faces to relieve the tips from bearing loads. The latter kind of relief is generally similar in effect to that disclosed in the F. E. McMullen Patent 2,385,220, but, being applied to the tips of the gear teeth rather than to the roots of the pinion teeth, as disclosed in the patent, obviates any undercutting of the pinion teeth.

The tips of the gear teeth are relieved by one or more blades of the cutter that are provided with tip-relieving profiles. These profiles have a somewhat greater pressure angle than the side-cutting blades; and while they are cutting the cutter is moved axially relative to the gear at a slower rate than when the side-cutting blades are cutting.

Heretofore the blades of the circular face mill gear cutters have been relieved back of their active edges to provide cutting clearance. The grinding of this relief must be very accurately engineered and controlled in order that the cutter diameter and blade pressure angle will remain unchanged as the blades are sharpened back after repeated use. The present invention, by moving the cutter in a helical path, enables the use of cutter blades whose side and tip surfaces are simple surfaces of revolution that may be produced more quickly and at much lower cost than relieved surfaces. The helical motion of the cutter is preferably in a direction to withdraw the cutter relatively from the work, whereby the helix lead angle constitutes a clearance angle back of the cutting edges.

The foregoing and other objects and advantages of the invention will appear from the following description made with reference to the drawings, wherein:

Fig. 10 is a fragmentary face view of a gear chamfered according to the present invention;

Figs. 11, 12 and 13 are fragmentary views on an enlarged scale taken in a plane axial of the cutter, and respectively illustrating three different forms of chamfering blade;

Figures 1, 2:
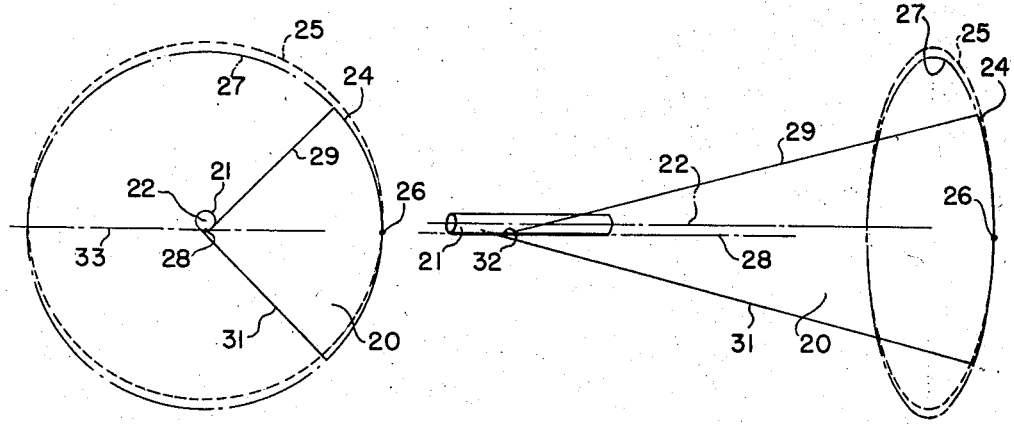
Figs. 1, 2 and 3 are respectively an end, a plan and a perspective side view of a geometrical construction illustrating the basis of one aspect of the invention.
Figure 3:
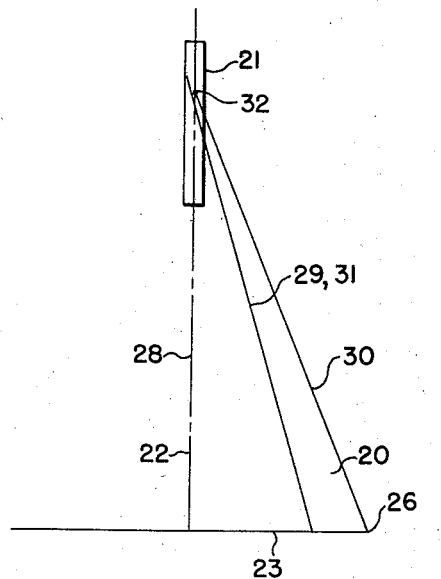

The principle on which one aspect of the invention is based is shown in Figs. 1, 2 and 3 where 20 represents an involute helicoidal surface whose base cylinder and axis are designated 21 and 22, respectively. The intersection of surface 20 with a transverse plane 23 is in involute 24. This involute departs substantially from a circle 25 lying in plane 23 and which is concentric with axis 22 and has the same radius as the polar radius of the involute at mean point 26. However for the range here concerned the involute 24 is substantially coincident with a circle 27 lying in the same plane as circle 25, and having the same radius of curvature as does the involute at point 26 and having its center on an axis 28 that is an element of cylinder 21. Moreover the elements of helicoid 20, such as 29 and 31, are straight lines and the helicoid therefore very closely approximates a cone whose base is circle 27 and whose apex is at the juncture point 32 with axis 28 of the straight line element of the helicoid 20 that contains mean point 26. This element of the helicoid, which appears as line 30 in Fig. 3, is also an element of the cone.

According to the present invention the teeth of the gear have substantially helicoidal surfaces, like surface 20, while the teeth of the generating gear of the pinion comprise conical surfaces like the surface of the cone whose axis is 28 and whose apex is 32. Accordingly the mating tooth surfaces of the gear and pinion will match as to pressure angle, exactly at a mean point along the length of the teeth and very closely at the ends of the teeth, so that bias tooth bearing is obviated. Following this principle does not preclude such slight mismatch of the mating tooth surfaces, as is usually desired in order to localize the tooth bearing. For example the cone whose apex is at 32 may be shifted along its common element with helicoid 20 (the element extending through mean point 26) to produce a slight mismatch of the surfaces. Furthermore it is not necessary that the axis of the conical surface be exactly parallel to axis 22 of the helicoid in order to obtain whatever coincidence or matching of the gear and pinion generating gear tooth surfaces is desired. The cone axis may extend at a small angle to axis 22 provided that it remains in the plane 33 containing the element 28 of base cylinder 21 and the point 26, and that the element of the cone which contains point 26 is coincident with the element of the helicoid that also contains point 26.

In the range contemplated by the present invention, the intersection of an involute helicoid such as 20 with a plane containing its axis 22 is so slightly curved that for practical purposes it may be reproduced by a cutter that has a straight cutting profile in the axial plane, by moving the cutter axially in time with its rotation. For theoretical correctness the cutter profile might be slightly curved in the axial plane, either by grinding such curvature into cutting edges which extend in this plane or by offsetting straight cutting edges from this plane by a distance equal to the radius of the base cylinder 21.

Figure 5:
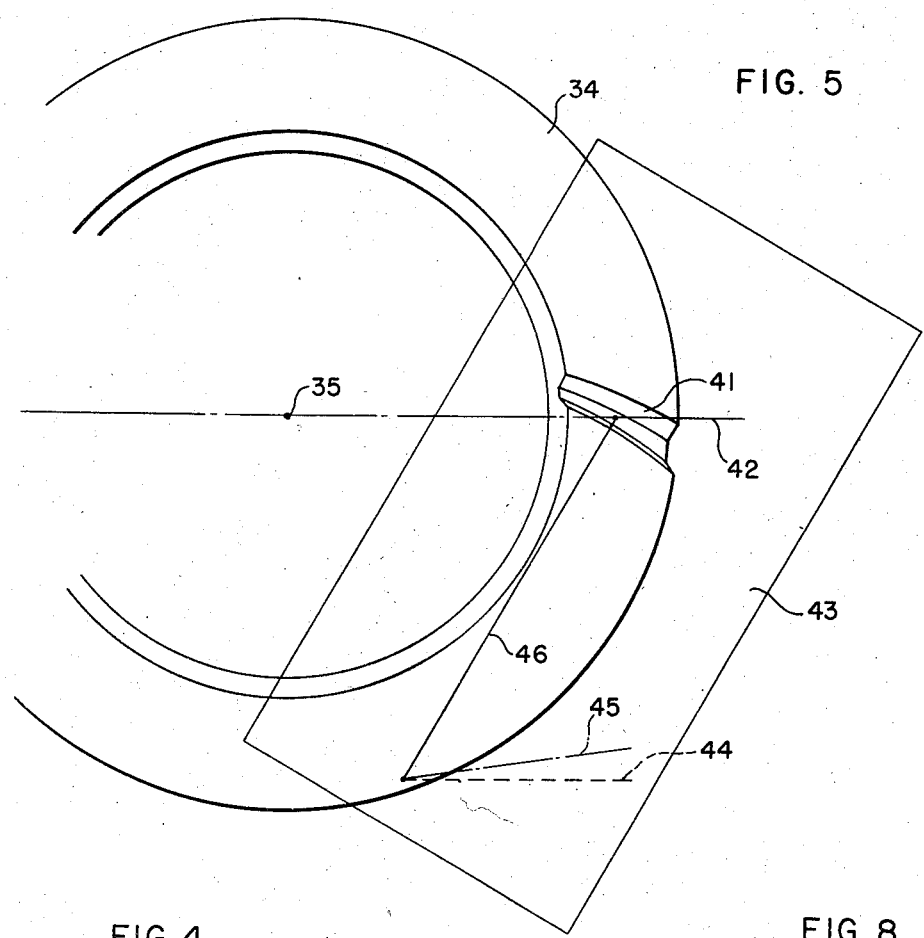
Figs. 4 and 5 are respectively an axial section and a face view of a ring gear to show the relationship therewith of the gear cutter axis.
Figure 4:
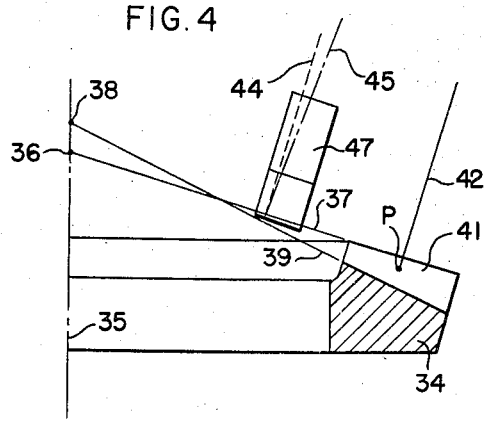
Figure 6:
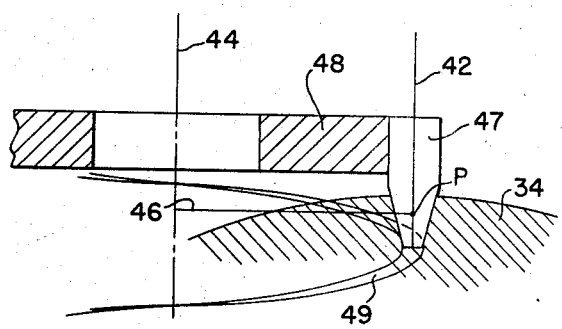
Figs. 6 and 7 are axial sections through the cutters, showing alternative relationships of the cutter axis to the gear.

In Figs. 4 and 5 is represented a non-generated tapered ring gear 34 whose axis 35 contains apex 36 of face cone 37 and apex 38 of root cone 39. P is a selected mean point of gear tooth space 41, and line 42 is the face normal inasmuch as it extends through P in a direction perpendicular to face cone 37. Plane 43 contains face normal 42 and itself is normal to the curved tooth space 41. Is corresponds to plane 33 of Fig. 1. The sides of the tooth space 41 are helicoidal surfaces, either substantially or exactly involute in form, like the surface 20 of Figs. 1 to 3. Their axis and also, of course, the axis of the cutter employed to produce them, lies in the normal plane 43 and may be either a line such as 44 in this plane that is parallel to face normal 42, corresponding to axis 22 of Figs. 1 to 3, or a line such as 45 also in plane 43 but which is disposed at an angle to face normal 42 and axis 44. In case 44 is the axis of the cutter, the line 46, which extends between lines 42 to 44 and is perpendicular to them, represents the mean radius of the cutter. In Figs. 4 and 6 a blade of the cutter is represented at 47, the blade being carried by a cutter head 48 rotating on axis 44. As the cutter rotates to sweep the blade through the tooth space 41, it is moved along axis 44 in time with its rotation, so that the tip of the blade follows a helical path 49 tangent to the root cone 39.

Figure 7:
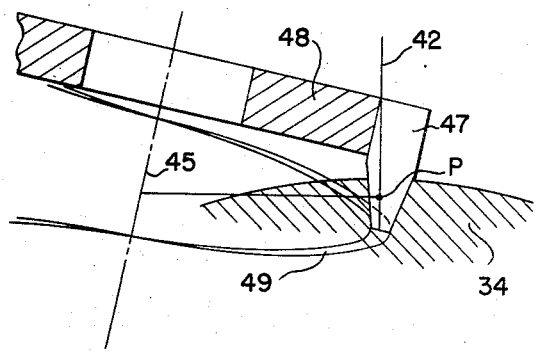

In Fig. 6 the pressure angles of the inside and outside cutting profiles of the cutter are symmetrical, and, since the cutter axis 44 is parallel to face normal 42, the pressure angles of the opposite sides of the tooth space are also equal at the mean point along the tooth length. In Fig. 7 the inside and outside cutting profiles are also of equal pressure angle, but in this case the cutter rotates on axis 45 that is inclined to the face normal 42, so that the pressure angles are different on opposite sides of the teeth at the mean point. This applies especially to hypoid gears. Unequal pressure angles can also be attained on the gear by using unequal blade angles.

The method of cutting the gear hereinbefore described enables the mating pinion to be generated on a conventional machine with a circular face mill cutter so tilted that its axis is parallel to plane 43, just as axis 28 is parallel to axis 22 in Figs. 1 and 3. Assuming that the gear and pinion are to be mounted at right angles, the pinion may be cut while set in the machine at ninety degrees to the axis of the generating motion of the cutter, i. e., to the axis of the cradle on which the cutter is mounted. This is in contrast to conventional practice where the plane which contains the axis of the gear cutter (corresponding to plane 43 in Fig. 5) is so positioned as to also contain a line (corresponding to line 42) which is normal to the root cone 39 instead of to the face cone 37 as shown in Fig. 4, with the result that at least one side of the pinion teeth has to be generated with the pinion set at an angle smaller than ninety degrees to the cradle axis. This requires a correspondingly greater tilt of the cutter.

Figure 8:
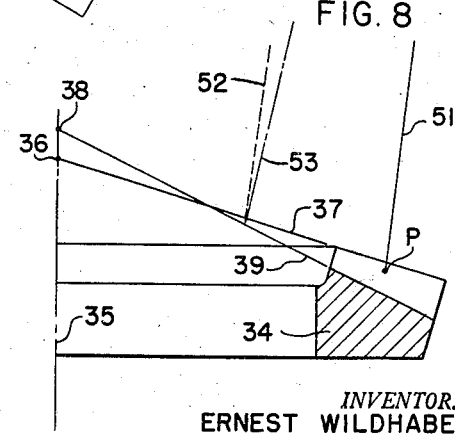
Fig. 8 is a view like Fig. 4 but showing an alternate disposition of the cutter axis.

In the heat treatment of spiral bevel and hypoid gears and pinions subsequent to cutting the teeth a distortion usually occurs that is in a direction to accentuate the bias bearing condition heretofore described, or, when the present method is used, to introduce bias where none exists in the gears and pinions as cut. To obviate this difficulty the present invention contemplates cutting the gear with an additional pressure angle variation from end to end of the tooth surfaces that will compensate for the heat treat distortion of both the gear and pinion. To this end the plane containing the cutter axis is so positioned as to intersect a plane containing the gear axis and the point P in a line which is inclined to the plane of rotation of the gear at an angle larger than the face angle of the gear. This is illustrated in Fig. 8 where the cutter axis plane, i. e. the plane corresponding to plane 43 in Fig. 5, is inclined so that its line of intersection 51 with the axial plane (the plane of Fig. 8) makes a smaller angle with axis 35 than does the face normal 42 (Fig. 4). The cutter axis is disposed in this cutter axis plane either at 52, parallel to line 51 (just as axis 44 is parallel to face normal 42), or at 53, inclined to line 51 (as axis 45 is inclined to 42).

Figure 9:
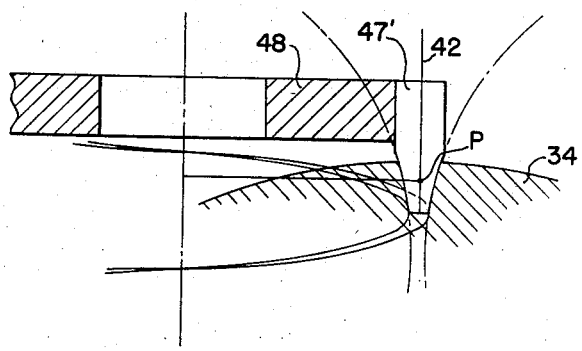
Fig. 9 is a view like Figs. 6 and 7 but showing a modified cutter blade.

In Figs. 6 and 7 the blade 47 is shown as having straight or nearly straight inside and outside cutting edges. If desired, substantially curved cutting edges (i. e. edges more curved than would be employed merely for profile mismatch) may be employed instead, and this is shown in Fig. 9 where the side cutting edges of blades 47' of the gear cutter are concave circular arcs of relatively small radius. The side cutting edges of the cutter for a mating pinion would be circular convex arcs of the same or slightly larger radius. Such curved cutting edges are more feasible with the present invention than with prior methods, because the tooth profiles match better throughout the length of the teeth.

Fig. 10 illustrates a relief, designated 54, at the tips of the teeth of gear 34, that is cut in the same operation and with the same cutter employed in cutting of the tooth space 41 proper. The relief may take the form of a chamfer, such as shown in Fig. 11, to eliminate sharp edges and burrs. In this case the relieved surfaces may be at a substantial angle 55 to the sides of the tooth space 41, i. e. to the working faces of the gear teeth; and a chamfering blade 56 having a relatively large pressure angle is employed for this purpose. Alternatively the tip relief 54 may, as shown in Fig. 12, be at a very small angle 57 from the working tooth faces, say an angle on the order of five degrees. In this case the cutting edges of the tip relieving blade 58 have a pressure angle only slightly greater than the cutting blade 47. The effect of such tip relief is to eliminate or at least greatly reduce tooth bearing loads from the top edge portions 59 of the gear teeth. In either case the relieving blade 56 or 58 is preferably arranged in the cutter head to precede the blade or blades 47 employed to finish cut the working tooth faces.

It is necessary that while the tip relieving blade 56 or 58 is transversing the tooth space the axial motion of the cutter be at a slower rate in relation to its rotation than when the blade 47 is cutting. This will be evident from Fig. 11 which shows that the blade 47 in passing from the section of the tooth space shown by full lines to the section shown by dotted lines, where the tooth space is wider, must move depthwise, i. e. axially of the cutter, a distance 61. To maintain substantially the same width of relief 54 along the tips of the teeth, the chamfering blade 56 need move depthwise only the smaller distance 62. The width of the tip relief along the tooth may be varied by varying the rate of the axial motion of the cutter as the blade 56 or 58 traverses the tooth space.

Due to the nature of curvature of the face cone of the gear and the spiral angle of the teeth, the width of the tip relief will not be exactly constant from end to end when the relieving blade follows a helix of constant lead while cutting. The variation in width will differ with the diameter of the gear (relative to the diameter of the cutter), with the face angle, and also with spiral angle. If satisfactory constancy of width for a particular purpose is not obtained with a constant ratio of cutter rotation to cutter axial motion, this ratio may be varied by employing a helical motion cam having a suitably varying lead. Another way of controlling the width of the tip relief is that shown in Fig. 13 where the side cutting edges of the relieving blade 63 are curved concavely, the curvature being so designed that as the blade cuts, moving along a helix of constant lead, the width of the tip relief will be constant from end to end of the tooth space.

Figure 14:
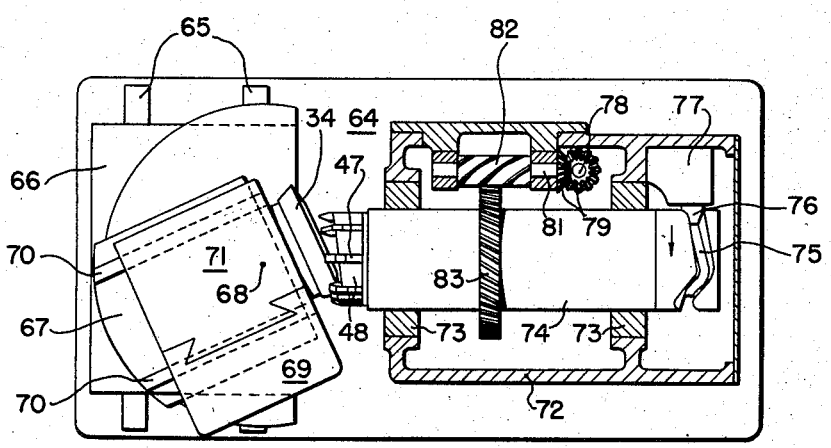
Fig. 14 is a plan view of the machine with parts in section.

A machine for practicing the invention is shown in Fig. 14. It includes a base 64 having ways 65 along which a slide 66 is adjustable laterally of the base, a swinging base 67 adjustable on the slide 66 about a vertical axis 68, and a column 69 adjustable along ways 70 of the swinging base. A work head 71 is adjustable vertically along vertical ways on column 69, and journaled in the head is a rotatable work support on which the gear blank 34 is mounted. Also mounted on base 64 is a column 72 having bearings 73 supporting a cutter spindle 74 for rotation and axial motion. On one end of the spindle is mounted the cutter head 48 while on the opposite end is a cam 75. The latter has a peripheral cam groove or track that is engaged by a roller 76 mounted on a bracket 77 that is secured to the column 72. The spindle 74 is rotated by means including vertical drive shaft 78, bevel gears 79, shaft 81, and helical pinion 82 and gear 83. The arrangement is such that during a portion of each revolution of the spindle the cutter is moved by cam means 75, 76 in an axial direction away from the gear 34, in time with its rotation, so that the cutter blades 47 move in a helical path while they are cutting; and during the remaining part of the revolution the spindle is returned axially to its initial position. During this return motion, and while a gap between the first and last blades of the cutter is abreast of the gear 34, the latter is indexed by rotation of the work spindle to bring a successive tooth space into cutting position. The indexing motion of the work spindle is accomplished by means, not shown, actuated by a drive train connected with the shaft 78 and hence operating in time with it. As shown, the face width of pinion 82 is great enough to accommodate the axial motion of the spindle.

Figures 15, 16:
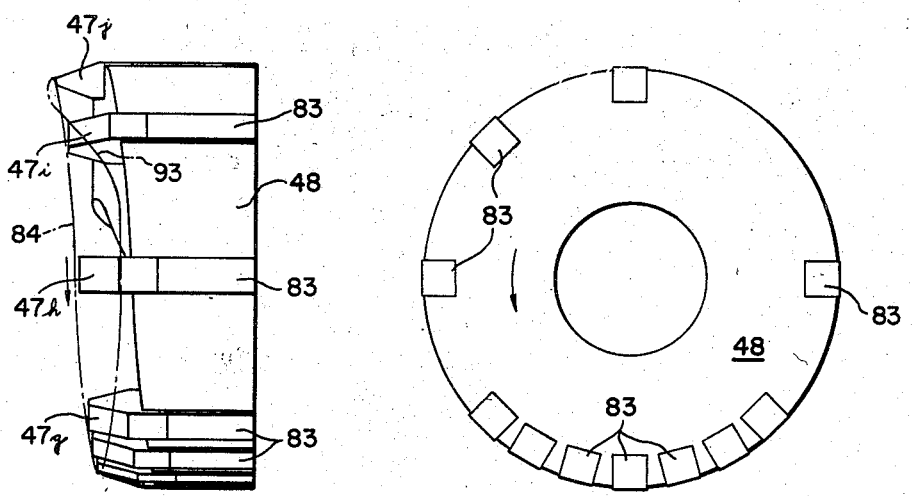
Figs. 15 and 16 are respectively a side and a rear elevation of the cutter.
Figure 17:
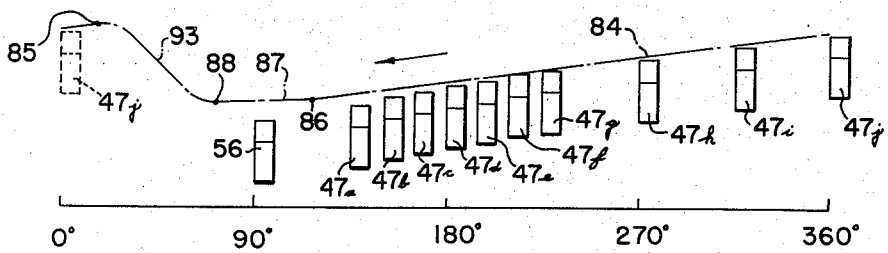
Fig. 17 is a plane development of a cylindrical layout of the cutter blades.
Figure 18:
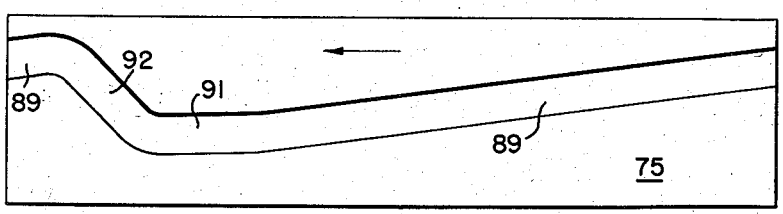
Fig. 18 is a plane development of the surface of a cam for effecting axial motion of the cutter.

A preferred form of cutter is shown in Figs. 15 and 16, and in the development Fig. 17, while a development of the matching cam 75 is shown in Fig. 18. Secured in recesses about the periphery of cutter head 48 are tooth-side-cutting blades designated 47a to 47j, inclusive, and chamfering blade 56. The blades may all be of the same height but by means of backing blocks 83 of varying height the side cutting blades are arranged along a constant lead helix 84 (extending between points 85 and 86 in Fig. 17) and the chamfering blade along a helix 87 (extending between points 86 and 88) of smaller lead. The blades 47a to 47j, inclusive, move along helix 84 as they cut, while blade 56 moves along helix 87 as it cuts, this motion being effected by the cam 75 whose track has a section 89 of lead equal to that of helix 84, another section 91 of lead equal to that of helix 87, and a return section 92. The latter effects return axial motion of the cutter, during which the blades move along a varying lead helix 93, between points 88 and 85 in Fig. 17.

In the form of cutter illustrated, the tips of blades 47f and 47g while cutting follow the helix 84. The tips of the others of blades 47a to 47j, inclusive, are slightly offset from the helix shown but they nevertheless follow along it, or, from another point of view, move along other helices having the same lead as helix 84, while they cut. Blades 47a to 47h, inclusive, are semi-finishing blades of increasing thickness and alternate ones of them cut on opposite sides of the tooth space, while blades 47i and 47j are the finishing blades for the respective sides of the gear teeth. Each finishing blade has only one side-cutting edge, while blades 47a to 47f, inclusive, have cutting edges also along their tips and they are arranged to cut progressively to greater depth, the final cut on the tooth bottom being made by blades 47f and 47g. The gap between the last blade to cut, 47j, and the first blade, chamfering blade 56, is wide enough to allow time for the work gear 34 to index, with the cutter in continuous rotation.

In operation, during each revolution of the cutter, during its first 90° of turning from the 0° position of Fig. 17, the work will be indexed to bring an unfinished tooth space into cutting position and the section 92 of the track of cam 75 will cooperate with roller 76 to advance the cutter axially to its limit position to the left in Fig. 14. As chamfering blade 56 traverses the tooth space the section 91 of the cam track rides on roller 76 to move the cutter axially away from the work, or to the right in Fig. 14, so that the blade follows helix 87, thereby producing a chamfer along both sides of the tooth space. Then while blades 47a to 47j, inclusive pass through the tooth space, moving from the large to the small end of the latter, the cam track section 89 cooperates with the roller to further move the cutter axially and at a more rapid rate, so that the blades follow helix 84, finish cutting the bottom and sides of the tooth space.

The cutter shown in Figs. 15 to 17, inclusive, is designed to rotate counterclockwise in Fig. 16, in the direction of the arrows in Figs. 15 and 17, so that during the cut it is moving axially away from the work, the blades passing from the outer or large ends of the tooth spaces to the inner or small ends thereof. This enables the blades to be ground without relief, cutting clearance back of the cutting edges being provided by the helical motion. Thus the blade shown in Fig. 19, which is intended to cut along the helix represented by the arrow, has its side surface 94 and tip surface 95 respectively formed as a surface of revolution and a plane, the helix lead angle constituting a clearance angle 96 back of the cutting edges.

A cutter blade designed to rotate in the opposite direction is shown in Fig. 20, wherein the arrow again indicates the helical path of the blade while cutting. In this case the helical motion reduces the effective blade clearance angle. As shown the relief angle 97 ground on the blade equals the sum of the helix lead angle and the effective relief angle 98.

Figure 21:
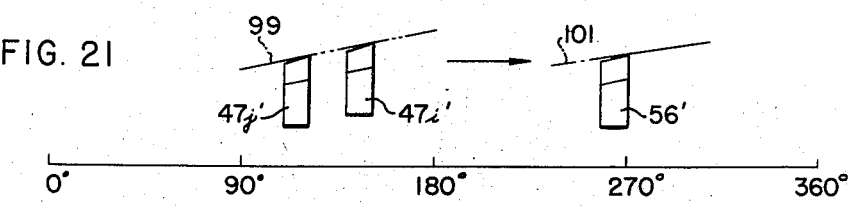
Fig. 21 is a development similar to Fig. 17 of a cutter arrangement employing blades of the kind shown in Fig. 20.
Figure 22:
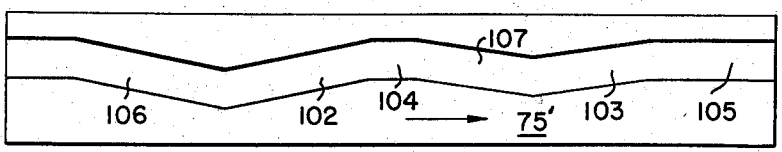
Fig. 22 is a development similar to Fig. 18 of a helical motion cam for use with the cutter of Fig. 21.
Figures 19, 20:
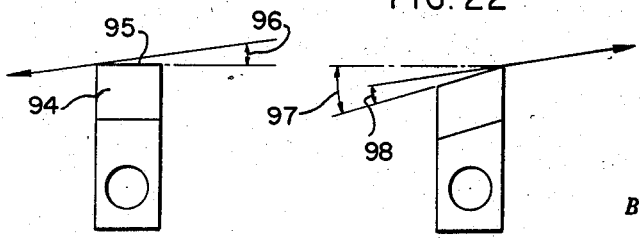
Fig. 19 is a side view of one blade of the cutter shown in Figs. 15 to 17 inclusive.
Fig. 20 is a side view of an alternative form of blade.

In Figs. 21 and 22 are shown a development of a three-bladed cutter employing blades of the kind illustrated in Fig. 20, and a development of a helical motion cam 75' to be used with the cutter. The latter has two finishing blades 47i' and 47j', one for each tooth side, arranged along a helix 99 and a chamfering blade 56' along a helix 101 of smaller lead. The track of cam 75' comprises a section 102 having the same lead as helix 99, a section 103 having the same lead as helix 101, dwell sections 104 and 105 which respectively precede sections 102 and 103, and return motion sections 106 and 107. With this cam arrangement the operation is as follows: During each revolution of the cutter the work will be indexed at a time when all of the blades (56', 47i' and 47j') are clear of the work and the roller is in dwell 105; then as the cam track section 103 rides on roller 76 the blade 56' moves through a tooth space from the small to the large end thereof, following helix 101, and producing a chamfer along each side of the tooth space; then as cam track section 107 rides on the roller the spindle will return axially, moving to the right in Fig. 14; then as cam track section 102 becomes effective, following dwell 104, the blades 47i' and 47j' pass through the tooth space, following along helix 99, and producing the finished gear tooth sides; and finally as cam track section 106 rides on the roller the cutter spindle will again return axially to the right to its initial position. The cycle will repeat for each other tooth space of the gear.

We claim as our invention:

1. The method of cutting a tapered gear comprising rotating in engagement with the gear a face cutter having a plurality of blades arranged substantially along a helix coaxial with the cutter, and as the cutter rotates, moving it depthwise relative to the gear so that all of said blades follow substantially along a helical path.

2. The method of cutting a gear according to claim 1 in which the blades present a plurality of inner and outer cutting profiles which move in coaxial helicoidal paths of the same lead, the last inner cutting profile and the last outer cutting profile being arranged to produce the finished tooth surfaces.

3. The method of cutting a gear according to claim 1 in which the relative depthwise movement of the cutter is in the direction of the cutter axis.

4. The method of cutting a gear according to claim 3 in which the relative depthwise movement is in constant velocity ratio to rotation of the cutter.

5. The method of cutting a gear according to claim 3 with a cutter having a gap between the last and first blades thereof, in which the gear is held against rotation while being cut, the cutter is returned to its initial axial position relative to the gear between cuts made by the last and first blades, and the gear is turned on its axis while the gap is abreast of the gear to bring another gear tooth space into cutting position.

6. The method of cutting a tapered gear comprising rotating in engagement with the gear a face cutter having successive blades with edges for cutting each side of the gear teeth progressively offset from a helicoid coaxial with the cutter, and moving the cutter axially relative to the gear as the cutter rotates, at a rate equal to the lead of said helicoid.

7. The method of cutting a gear having teeth of tapering depth according to claim 1 in which the direction of rotation of the cutter is such that the blades pass from the large to the small end of the tooth space being cut.

8. The method of cutting a tapered gear comprising rotating in engagement with the gear a face cutter having a plurality of blades with side cutting profiles having different pressure angles and moving the cutter axially relative to the gear at respectively different rates as profiles of different pressure angles traverse the gear.

9. The method of cutting a gear according to claim 8 in which the profiles of higher pressure angle are adapted for cutting the sides of the teeth adjacent the tops thereof and are curved.

10. The method of cutting a gear to provide teeth of tapering depth and tip relief, comprising rotating in engagement with the gear a face cutter having side and tip cutting profiles for each side of the gear teeth, with the tip cutting profiles having a greater pressure angle than the side cutting profiles, moving the cutter axially relative to the gear at one rate while the side cutting profiles are cutting and at a slower rate while the tip cutting profiles are cutting.

11. The method of cutting a gear according to claim 10 in which the tip cutting profiles are curved to control the width of the tip relief from end to end of the teeth.

12. The method of cutting a gear having tooth spaces of tapering depth and width with a rotary cutter having a plurality of blades presenting side cutting and tip relieving profiles arranged the cut in different positions of rotation of the cutter, the tip relieving profiles having greater pressure angles than the side cutting profiles, comprising rotating the cutter in contact with the gear to cause all of said blades to cut and, during the portion of such rotation when the tip relieving profiles are active, moving the cutter axially to thereby produce relief surfaces of helicoidal shape.

13. A rotary cutter for a non-generated spiral bevel or hypoid gear having tooth spaces of tapered depth comprising a head and a plurality of blades projecting from the head in a generally axial direction, the blades having side cutting edges, that are disposed substantially upon one or more helicoids coaxial with the cutter, said side cutting edges being inclined to the cutter axis in accordance with the pressure angle of the gear teeth, and the helix angle of said helicoids being such that the cutter blades may follow substantially along said root cone by being moved in a helical path of the same helix angle about the cutter axis when the latter is disposed in a plane containing a line that passes through the mean point of the tooth space being cut and is substantially normal to the face cone of the gear.

14. A rotary cutter for a non-generated spiral bevel or hypoid gear having tooth spaces of tapered depth comprising a head and a plurality of blades projecting from the head in a generally axial direction, the blades presenting at least one side cutting edge for producing each side of the gear teeth, the edge for one side being disposed substantially upon a helicoid coaxial with the cutter, and the edge for the other side upon a coaxial helicoid of the same lead, said side cutting edges being inclined to the cutter axis in accordance with the pressure angle of the gear teeth, and the helix angle of said helicoids being such that the cutter blades may follow substantially along said root cone by being moved in a helical path of the same helix angle about the cutter axis when the latter is disposed in a plane containing a line that passes through the mean point of the tooth space being cut and is substantially normal to the face cone of the gear.

15. A rotary gear cutter according to claim 13 in which the side of each blade which contains the side cutting edge is a surface of revolution substantially coaxial with the cutter.

16. A rotary cutter for a spiral bevel or hypoid gear having tooth spaces of tapering depth comprising a head and a plurality of blades projecting axially therefrom, the sides of the blades containing the side cutting edges thereof being substantially conical surfaces coaxial with the cutter, such conical surfaces of successful blades being offset from one another progressively in the direction of the cutter axis, the direction and amount of the offset being such that the blades cut from the large to the small end of a tooth space to remove successive layers of stock from the sides of the space as the rotating cutter and the gear are relatively withdrawn in the direction of the cutter axis at a rate relative to the rate of rotation that is sufficient to provide cutting clearance for said surfaces back of the cutting edges.

17. A rotary cutter for a spiral bevel or hypoid gear having teeth of tapered depth, the cutter being adapted to be moved axially relatively away from the gear as it rotates in a gear tooth space from the large to the small end thereof, comprising a cutter head and two series of cutter blades projecting axially from the head, the blades of one series having outside cutting edges and those of the other series having inside cutting edges, said edges being on outside and inside surfaces of the respective series of blades which are substantially conical surfaces coaxial with the cutter, such surfaces of successive blades of each series being offset from one another progressively in the direction of the cutter axis, the direction and amount of offset being such that the blades cut from the large to the small end of a tooth space to remove successive layers of stock from the sides of the space as the rotating cutter and the gear are relatively withdrawn at a rate relative to the rate of rotation that is sufficient to provide cutting clearance for said surfaces back of the cutting edges.

18. A rotary gear cutter according to claim 17 in which the tip cutting profiles are concave curves to control the width of the relieved surfaces from end to end of the teeth.

19. A rotary cutter for a spiral bevel or hypoid gear having tooth spaces of tapering depth, comprising a head and a plurality of blades projecting therefrom in a generally axial direction, said blades presenting at least one inside and one outside side cutting profile, each of positive pressure angle, and one inside and one outside tip cutting profile, the tip cutting profiles having greater pressure angles than the respective side cutting profiles and being so spaced from the side cutting profiles that they can cut only when the side cutting profiles are out of the cut, the side cutting profiles being positioned on the cutter head to cut the opposite sides of a tooth space when the cutter is moved relative to the gear in a helical path of such lead that the tips of the profiles follow substantially along the root of the tooth space and the tip cutting profiles being so positioned on said head as cut relieved surfaces along the top edges of the tooth sides when the cutter is moved in a helical path of smaller lead.

20. Apparatus for cutting a tapered gear comprising a support for the gear, a cutter mounted for rotation and axial motion relative to said support, the cutter having a plurality of axially projecting blades whose active portions are arranged substantially in a helix of constant diameter, means for rotating the cutter, and means for moving the cutter relative to the gear axially in time with such rotation as the blades traverse the gear.

21. Apparatus according to claim 20 in which there is a gap between the first and last blades of the cutter, and there are means for returning the cutter to its initial axial position relative to said support while said gap is abreast of the gear, and means for turning the gear support to bring another gear tooth space into cutting position while the cutter is clear of the gear.

22. Apparatus for cutting a gear to provide teeth of tapering depth and tip relief, comprising a support for the gear, a cutter mounted for rotation and for axial motion relative to the gear, the cutter having a plurality of blades presenting side cutting profiles having different pressure angles, means for rotating the cutter, and means for moving the cutter relative to the gear axially in time with such rotation, the last mentioned means being arranged to effect the axial motion at respectively different rates as the profiles of different pressure angles traverse the gear.

23. Apparatus according to claim 22 in which the cutter has blades presenting side and tip cutting profiles for each side of the gear teeth, with the tip cutting profiles having greater pressure angles than the side cutting profiles, and the means for moving the cutter axially relative to the gear effects such movement at one rate while the side cutting profiles are acting and at a slower rate while the tip cutting profiles are acting.

24. Apparatus for cutting a gear with tooth spaces of tapering depth and width in a manner to provide teeth having tip relief, comprising a support for the gear, a cutter mounted for rotation and for axial motion relative to the gear, the cutter having blades presenting side cutting and tip relieving profiles with the tip relieving profiles having greater pressure angles than the side cutting profiles, said side cutting and tip relieving profiles being arranged to cut in different positions of rotation of the cutter, means for rotating the cutter, and means for moving the cutter axially relative to the gear in time with such rotation while the tip relieving profiles traverse the gear to thereby produce relief surfaces of helicoidal shape.

25. Apparatus for cutting a tapered gear comprising a support for the gear, a cutter mounted for rotation and axial motion, the cutter having at least one blade projecting therefrom in a generally axial direction and presenting a side cutting edge, the side surface of the blade which contains said edge being a surface of revolution substantially coaxial with the cutter, means for rotating the cutter to cause said blade to traverse the face of the gear from the large end to the small end thereof, and means for moving the cutter axially relative to the gear, in a direction away from the gear, as said edge traverses said face, cutting clearance for said surface of revolution back of said edge being provided by the relative axial motion.

26. The method of cutting a gear according to claim 1 in which the axis of the cutter lies in a plane containing a line which passes through the mean point in the tooth space being cut and is substantially perpendicular to the face cone of the gear.

27. The method of cutting a tapered gear having tooth spaces of tapering depth which comprises moving a cutter across the gear in a helical path whose helix axis lies in a plane which interesects a plane containing the gear axis in a line that passes through the mean point of the tooth space being cut and is inclined to the plane of rotation of the bear by an angle at least substantially as large as the face angle of the gear.

28. The method of cutting a tapered gear having tooth spaces of tapering depth which comprises moving a cutter across the gear in a helical path whose helix axis lies in a plane which intersects a plane containing the gear axis in a line that passes through the mean point of the tooth space being cut and is inclined to the plane of rotation of the gear by an angle larger than the face angle of the gear.

29. The method of cutting a tapered gear having tooth spaces of tapering depth which comprises moving a cutter across the gear in a helical path whose helix axis lies in a plane which contains a line that passes through the mean point of the tooth space being cut and is substantially normal to the face cone of the gear.

30. The method of producing a pair of tapering gears having tapered tooth spaces, comprising generating the pinion member with a rotary face mill cutter representing an imaginary tapered generating gear having conical tooth surfaces, with the cutter so positioned that its tip edges cut substantially along the face cone of said generating gear and the root cone of the pinion member, such generation being effected by a relative motion between the pinion member and cutter as though the pinion member were rolling upon said generating gear; and cutting the gear member of the pair by moving a cutter across the gear member in a helical path whose helix axis lies in a plane containing a line which passes through the mean point in the tooth space being cut and is substantially normal to the face cone of the gear member.

31. The method of producing a pair of tapering gears having tapered tooth spaces, comprising generating the pinion member with a rotary face mill cutter representing an imaginary tapered generating gear having conical tooth surfaces, with the cutter so positioned that its tip edges cut substantially along the face cone of said generating gear and the root cone of the pinion member, such generation being effected by a relative motion between the pinion member and cutter as though the pinion member were rolling upon said generating gear; and cutting the gear member of the pair by moving a cutter across the gear member in a helical path whose helix axis lies in a plane which intersects a plane containing the axis of the gear member in a line that passes through the mean point of the tooth space being cut and is inclined to the plane of rotation of the gear member by an angle larger than the face angle of the gear member.

32. The method of finish cutting a tapered non-generated gear having tooth spaces of tapering depth, with a rotary cutter which while rotating is moved along its axis to cause a finish cutting edge thereof to traverse the gear in a helical path of constant radius, the axis of the cutter being positioned to lie in a plane which contains a line that passes through the mean point of the tooth space being cut and is substantially normal to the face cone of the gear.

References Cited in the file of this patent

UNITED STATES PATENTS

| | | |
|---|---|---|
| 1,000,888 | Beche | Aug. 15, 1911 |
| 1,579,888 | Raszl | Apr. 6, 1926 |
| 1,696,930 | Wildhaber | Jan. 1, 1929 |
| 2,105,104 | Wildhaber et al. | Jan. 11, 1938 |
| 2,339,375 | Cassel | Jan. 18, 1944 |
| 2,346,806 | Wildhaber | Apr. 18, 1944 |
| 2,384,499 | Stewart | Sept. 11, 1945 |
| 2,405,171 | Wildhaber | Aug. 6, 1946 |
| 2,509,660 | Wingren | May 30, 1950 |
| 2,510,528 | Soper | June 6, 1950 |
| 2,648,894 | Wildhaber | Aug. 18, 1953 |
| 2,718,176 | King | Sept. 20, 1955 |